United States Patent
Uchino et al.

(10) Patent No.: US 9,730,231 B1
(45) Date of Patent: Aug. 8, 2017

(54) USER EQUIPMENT, MOBILE COMMUNICATION SYSTEM, AND DEACTIVATION TIMER CONTROL METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/324,012

(22) PCT Filed: Jul. 13, 2015

(86) PCT No.: PCT/JP2015/070071
§ 371 (c)(1),
(2) Date: Jan. 5, 2017

(87) PCT Pub. No.: WO2016/010001
PCT Pub. Date: Jan. 21, 2016

(30) Foreign Application Priority Data

Jul. 15, 2014 (JP) ................................. 2014-145397

(51) Int. Cl.
*H04W 72/00* (2009.01)
*H04W 72/04* (2009.01)
(Continued)

(52) U.S. Cl.
CPC ........... *H04W 72/048* (2013.01); *H04L 69/28* (2013.01); *H04W 52/0209* (2013.01); *H04W 72/0453* (2013.01); *H04W 88/085* (2013.01)

(58) Field of Classification Search
CPC ..... H04W 72/04; H04W 8/245; H04W 28/04; H04M 1/72519
(Continued)

(56) References Cited

U.S. PATENT DOCUMENTS

2012/0281680 A1* 11/2012 Bostrom ............... H04L 5/0051
370/336
2014/0029586 A1* 1/2014 Loehr ............... H04W 56/0005
370/336
(Continued)

OTHER PUBLICATIONS

International Search Report issued in corresponding application No. PCT/JP2015/070071 mailed Sep. 15, 2015 (4 pages).
(Continued)

*Primary Examiner* — Danh Le
(74) *Attorney, Agent, or Firm* — Osha Liang LLP

(57) ABSTRACT

User equipment that executes carrier aggregation includes a controller that executes timer control for deactivating a cell used for the carrier aggregation, based on expiration of a timer; and a receiver that receives, from the base station, setting information including a timer value of the timer used in the controller, wherein, when the setting information including a common timer value that is common for multiple cells used for the carrier aggregation and an individual timer value that is specified for each cell is received, the controller executes the timer control by applying the individual timer value to the specified cell, and when another cell is used for which no individual timer value is specified, the timer control is executed by applying the common timer value.

9 Claims, 11 Drawing Sheets

(51) Int. Cl.
*H04L 29/06* (2006.01)
*H04W 52/02* (2009.01)
*H04W 88/08* (2009.01)

(58) Field of Classification Search
USPC ............... 455/450, 418, 550.1; 370/329
See application file for complete search history.

(56) References Cited

U.S. PATENT DOCUMENTS

| | | | | |
|---|---|---|---|---|
| 2014/0198762 | A1* | 7/2014 | Yang ................ | H04W 56/0005 370/329 |
| 2015/0011215 | A1* | 1/2015 | Uemura ............. | H04W 72/042 455/436 |
| 2015/0296512 | A1* | 10/2015 | Bergstrom .......... | H04L 5/001 370/329 |
| 2016/0029387 | A1* | 1/2016 | Uemura .............. | H04W 48/18 370/329 |
| 2016/0157219 | A1* | 6/2016 | Uemura .............. | H04W 16/00 370/329 |
| 2016/0165627 | A1* | 6/2016 | Uemura ............. | H04W 76/046 370/336 |
| 2016/0219475 | A1* | 7/2016 | Kim .................. | H04W 76/025 |
| 2017/0127473 | A1* | 5/2017 | Virtej ................ | H04W 76/068 |

OTHER PUBLICATIONS

Written Opinion of the International Searching Authority issued in corresponding application No. PCT/JP2015/070071 mailed Sep. 15, 2015 (3 pages).
3GPP TS 36.300 V12.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Mar. 2014 (209 pages).
3GPP TS 36.331 V12.1.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2014 (356 pages).
3GPP TS 36.321 V10.10.0, "3rd Generation Partnership Project; Technical Specification Group Radio Access Network; Evolved Universal Terrestrial Radio Access (E-UTRA); Medium Access Control (MAC) protocol specification (Release 10)"; Dec. 2013 (55 pages).
NTT Docomo, Inc., "Deactivation timer value per SCell"; 3GPP TSG-RAN WG2 #86, R2-142483; Seoul, South Korea; May 19-23, 2014 (2 pages).

\* cited by examiner

FIG.11A

```
-- ASN1START

MAC-MainConfig information element

MAC-MainConfig ::=        SEQUENCE {
    ul-SCH-Config             SEQUENCE {
        maxHARQ-Tx                ENUMERATED {
                                      n1, n2, n3, n4, n5, n6, n7, n8,
                                      n10, n12, n16, n20, n24, n28,
                                      spare2, spare1}    OPTIONAL, -- Need ON

[[ mac-MainConfig-v1020   SEQUENCE {
        sCellDeactivationTimer-r10    ENUMERATED {
                                      rf2, rf4, rf8, rf16, rf32, rf64, rf128,
                                      spare]            OPTIONAL, -- Need STAG-Id-r11::=                INTEGER (1..maxSTAG-r11)
DedicatedsCellDeactivationTimerList-r12::= SEQUENCE (SIZE (1.. maxSCell-r10)) OF
DedicatedsCellDeactivationTimer-r12

DedicatedsCellDeactivationTimer-r12    ::= SEQUENCE {
    sCellIndex-r10                SCellIndex-r10,
    sCellDeactivationTimer-r10    ENUMERATED {
                                      rf2, rf4, rf8, rf16, rf32, rf64, rf128,
                                      spare]            OPTIONAL, -- Need OP
]]

-- ASN1STOP
```

FIG.11B

| MAC-MainConfig field descriptions |
|---|
| DedicatedsCellDeactivationTimer<br>SCell deactivation timer in TS 36.321 [6]. Value in number of radio frames. Value rf4 corresponds to 4 radio frames, value rf8 corresponds to 8 radio frames and so on. E-UTRAN only configures the field if the UE is configured with one or more SCells. If the field is present, UE shall apply the value to the SCell indicated by the SCellIndex. Otherwise, the UE shall apply the same value indicated by the field of *sCellDeactivationTimer* for the SCell. |
| sCellDeactivationTimer<br>SCell deactivation timer in TS 36.321 [6]. Value in number of radio frames. Value rf4 corresponds to 4 radio frames, value rf8 corresponds to 8 radio frames and so on. E-UTRAN only configures the field if the UE is configured with one or more SCells. If the field is absent, the UE shall delete any existing value for this field and assume the value to be set to *infinity*. The same value applies for each SCell (although the associated functionality is performed independently for each SCell). |

USER EQUIPMENT, MOBILE COMMUNICATION SYSTEM, AND DEACTIVATION TIMER CONTROL METHOD

TECHNICAL FIELD

The present invention relates to a mobile communication system, and especially related to deactivation control of a SCell in carrier aggregation.

BACKGROUND ART

For the LTE-Advanced, carrier aggregation (CA: Carrier Aggregation) has been adopted in which communication is performed by simultaneously using a plurality of carriers while using bandwidths supported by the LTE (up to 20 MHz) as basic units, so that throughput can be achieved that exceeds that of the LTE, while maintaining backward compatibility with the LTE (cf. Non-Patent Document 1, for example). A carrier that can be a basic unit in the carrier aggregation is referred to as a component carrier (CC: Component Carrier).

When the CA is performed, a PCell (Primary cell), which is a highly reliable cell for ensuring connectivity, and a SCell (Secondary cell), which is a subsidiary cell, are established for user equipment UE. First, the user equipment UE connects to the PCell; and can add the SCell, depending on necessity. The PCell is the same as a cell of the LTE scheme that supports the RLM (Radio Link Monitoring), the SPS (Semi-Persistent Scheduling), and so forth.

The SCell is established for the user equipment UE, in addition to the PCell. Addition and deletion of the SCell are performed through the RRC (Radio Resource Control) signaling. The SCell is in a deactivated state (deactivate state) immediately after it is established for the user equipment UE, so that it is a cell in which communication is enabled (scheduling is enabled) only after it is activated in the MAC (Media Access Control) layer. For the SCell, activation/deactivation is controlled by a MAC signal from the base station eNB.

Note that, for TDD, the PCell is formed of a single CC; and for FDD, the PCell is formed of an uplink CC and a downlink CC. Further, for TDD, the SCell is formed of a single CC; and for FDD, the SCell is formed of a downlink CC (and an uplink CC, depending on necessity). Furthermore, there are cases where the "cell," such as the PCell and the SCell, is used as a synonym of the CC.

PRIOR ART DOCUMENT

Non-Patent Document

Non-Patent Document 1: 3GPP TS 36.300 V12.1.0 (2014-03)
Non-Patent Document 2: 3GPP TS 36.331 V12.1.0 (2014-03)
Non-Patent Document 3: 3GPP TS 36.321 V10.10.0 (2013-12)
Non-Patent Document 4: 3GPP TSG-RAN WG2 #86 19-23 May 2014 R2-142483

SUMMARY OF INVENTION

Problem to be Solved by the Invention

For the LTE, by a SCell deactivation timer (sCellDeactivationTimer, which is referred to the "deactivation timer" or the "timer," hereinafter), control is performed for deactivating the SCell (cf. Non-Patent Documents 2 and 3). Basically, when the SCell is activated, upon receiving the PDCCH (downlink or uplink resource allocation), the user equipment UE restarts the deactivation timer associated with the SCell; and performs control for deactivating the SCell, if the deactivation timer expires without receiving a PDCCH.

For the CA according to up to Rel-11 of the LTE, since a value of the deactivation timer can be set in units of user equipment UEs, a single setting value is applied to all the SCells. These specifications are specified on the assumption that the timer value is determined by a traffic characteristic of a service (e.g., inter-packet arrival time). However, for a case where the timer value of the deactivation timer is set in units of user equipment UEs (i.e., common for the SCells), there is a problem as described below.

FIG. 1 is a diagram illustrating a system configuration, which can be the assumption for describing the problem. As illustrated in FIG. 1, in the system, the base station eNB forms, in each of three directions, a PCell and a SCell #1, as macro cells; and CA is further configured by forming a SCell #2, which is a small cell, by a RRH (Remote Radio Head) that is extended from a base station eNB (HetNet scenario).

FIG. 2 and FIG. 3 are diagrams illustrating the problem for the case where, in the configuration of FIG. 1, the same timer values are applied to all the SCells. FIG. 2 illustrates an example of a case where the timer value is small; and FIG. 3 illustrates an example of a case where the timer value is large.

As illustrated in FIG. 2, for the case where the timer value is small, after receiving, by the user equipment UE, PDCCHs in the SCell #1 and the SCell #2, respectively, the timer expires in a short time, and the SCell #1 and the SCell #2 are deactivated. In this case, the base station eNB immediately becomes unable to schedule, so that response is degraded due to delay, and an effect of off-loading to the small cell is also reduced. However, there is an advantage that a battery saving effect is large in the user equipment UE. As illustrated in FIG. 3, for the case where the timer value is large, opportunities for the base station eNB to schedule are increased, so that response is enhanced, and the effect of off-loading to the small cell is enlarged. However, a problem is that battery energy consumption is enlarged in the user equipment UE.

Consequently, it has been studied to allow, in Rel-12, timer values to be individually set to the SCells (cf. Non-Patent Document 4).

However, for allowing the timer values to be individually set to the SCells, it is not clear as to how signaling is to be performed in the RRC; and if a configuration is adopted that merely allows individual setting, backward compatibility may not be ensured. For example, since the user equipment UE is unable to recognize the release (the Release number) of the base station eNB, even if individual timer values are expected for the SCells, the base station eNB actually supports only up to Rel-11, so that the timer value for each user equipment UE (the timer values common for the SCells) might have been notified. In such a case, the user equipment UE may not properly set the timer value, and the deactivation timer control of the SCells may not be properly performed, so that battery energy waste may occur, for example.

The present invention has been achieved in view of the above-described point, and an object is to provide a technique that allows deactivation timer control to be properly performed for a case of setting cell individual timer values for a mobile communication system, in which, for the deactivation timer control of cells for carrier aggregation, a timer value is to be set that is common for the cells.

Means for Solving the Problem

According to an embodiment of the present invention, there is provided user equipment of a mobile communication system in which communication is performed between the user equipment and a base station by carrier aggregation, the user equipment including a controller that executes timer control for deactivating a cell used for the carrier aggregation, based on expiration of a timer; and a receiver that receives, from the base station, setting information including a timer value of the timer used in the controller, wherein, when the receiver receives the setting information including a common timer value that is common for multiple cells used for the carrier aggregation and an individual timer value that is specified for each cell, the controller executes the timer control by applying the individual timer value to the specified cell, and when another cell is used for which no individual timer value is specified, the controller executes the timer control by applying the common timer value to the other cell.

Further, according to an embodiment of the present invention, there is provided a mobile communication system including user equipment and a base station that perform carrier aggregation, wherein the user equipment includes a controller that executes timer control for deactivating a cell used for the carrier aggregation, based on expiration of a timer; and a receiver that receives, from the base station, setting information including a timer value of the timer used in the controller, wherein the base station includes a transmitter that transmits, to the user equipment, the setting information including a common timer value that is common for multiple cells used for the carrier aggregation, or the setting information including both the common timer value and an individual timer value specified for each cell, wherein, when the user equipment receives, by the receiver, the setting information including the common timer value and the individual timer value, the user equipment executes, by the controller, the timer control by applying the individual timer value to the specified cell, and when another cell is used for which no individual timer value is specified, the user equipment executes, by the controller, the timer control by applying the common timer value to the other cell.

Furthermore, according to an embodiment of the present invention, there is provided a deactivation timer control method to be executed by user equipment of a mobile communication system in which communication is performed between the user equipment and a base station by carrier aggregation, the deactivation timer control method including a receiving step of receiving, from the base station, setting information including a timer value of a timer that is used for timer control for deactivating a cell used for the carrier aggregation, based on expiration of the timer; and a controlling step of executing the timer control, wherein, when the user equipment receives, in the receiving step, the setting information including a common timer value that is common for multiple cells used for the carrier aggregation, and an individual timer value that is specified for each cell, the user equipment executes, in the controlling step, the timer control by applying the individual timer value to the specified cell, and when another cell is used for which no individual timer value is specified, the user equipment executes, in the controlling step, the timer control by applying the common timer value to the other cell.

Advantage of the Invention

According to an embodiment of the present invention, in a mobile communication system, in which, for deactivation timer control of cells for carrier aggregation, a timer value is to be set that is common for the cells, the deactivation timer control can be properly performed, even for a case of setting cell individual timer values.

BRIEF DESCRIPTION OF DRAWINGS

FIG. 11A is a diagram illustrating an example of a RRC message provided with individual timer information;

FIG. 11B is a diagram illustrating an example of the RRC message provided with the individual timer information;

EMBODIMENTS OF THE INVENTION

Figure 1:
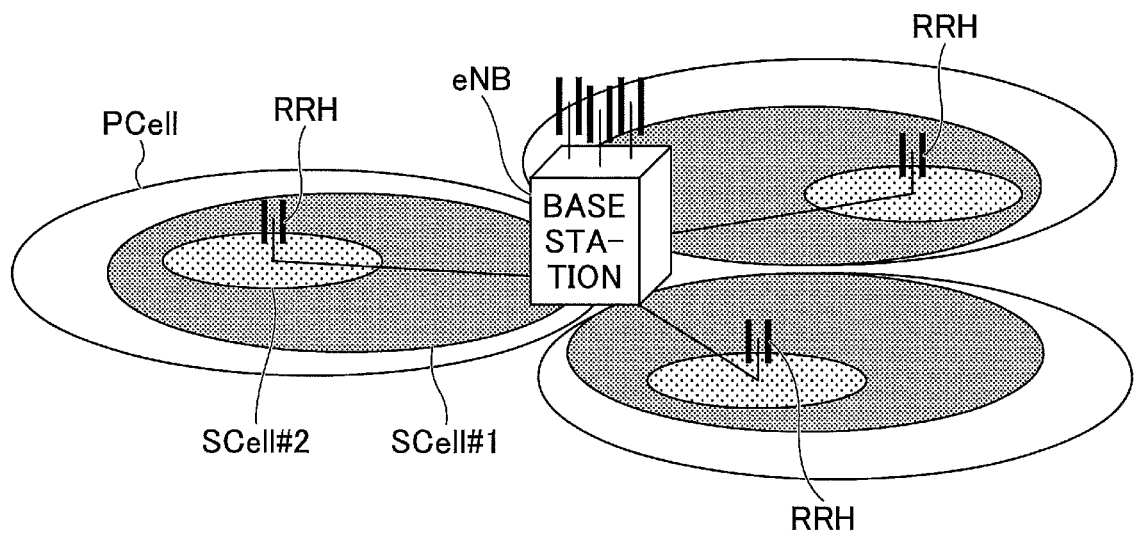
FIG. 1 is a system configuration diagram that can be an assumption for describing a problem.
Figure 2:
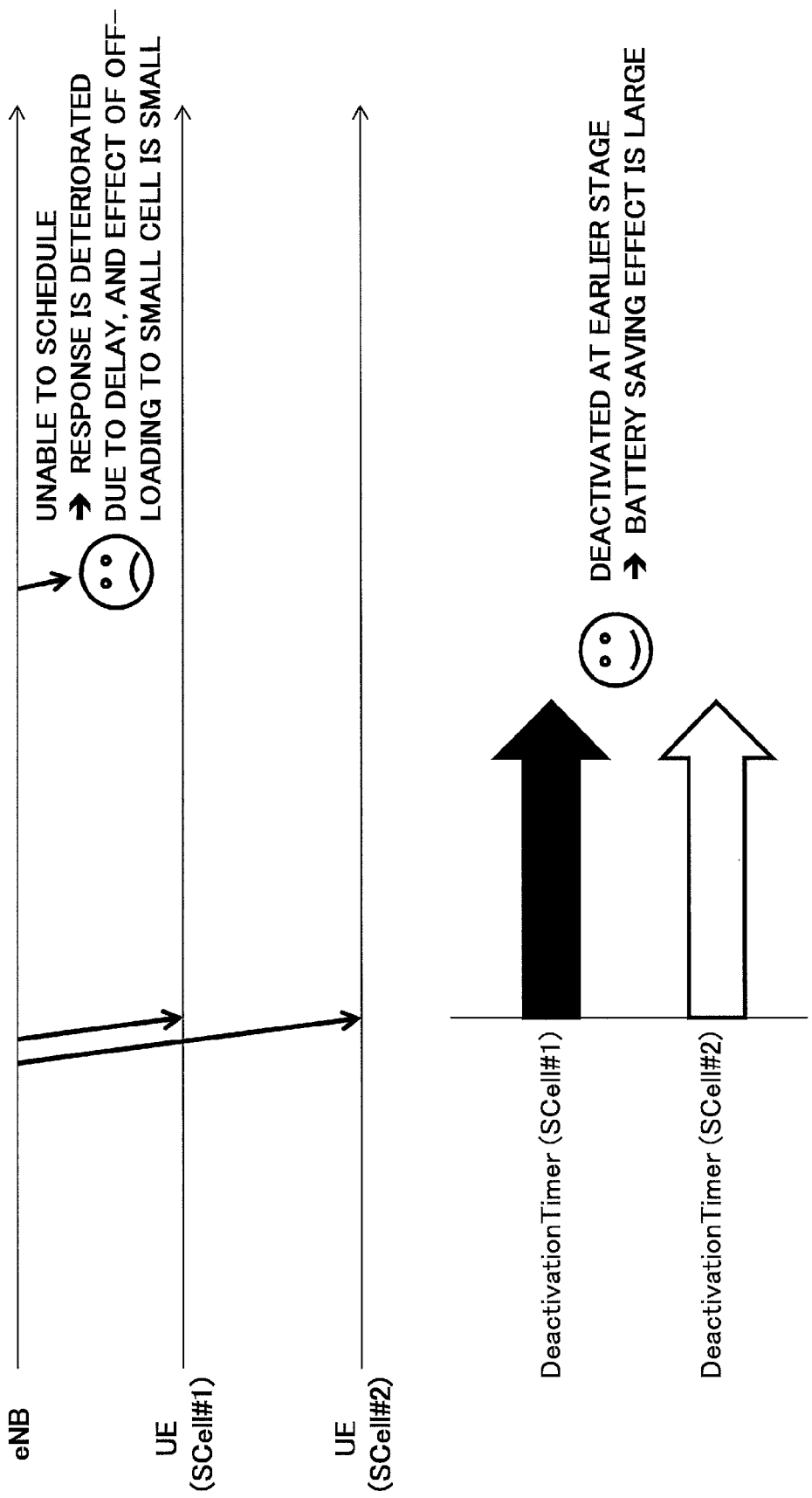
FIG. 2 is a diagram illustrating an operation related to a sCellDeactivationTimer (a short case) in units of UEs.
Figure 3:
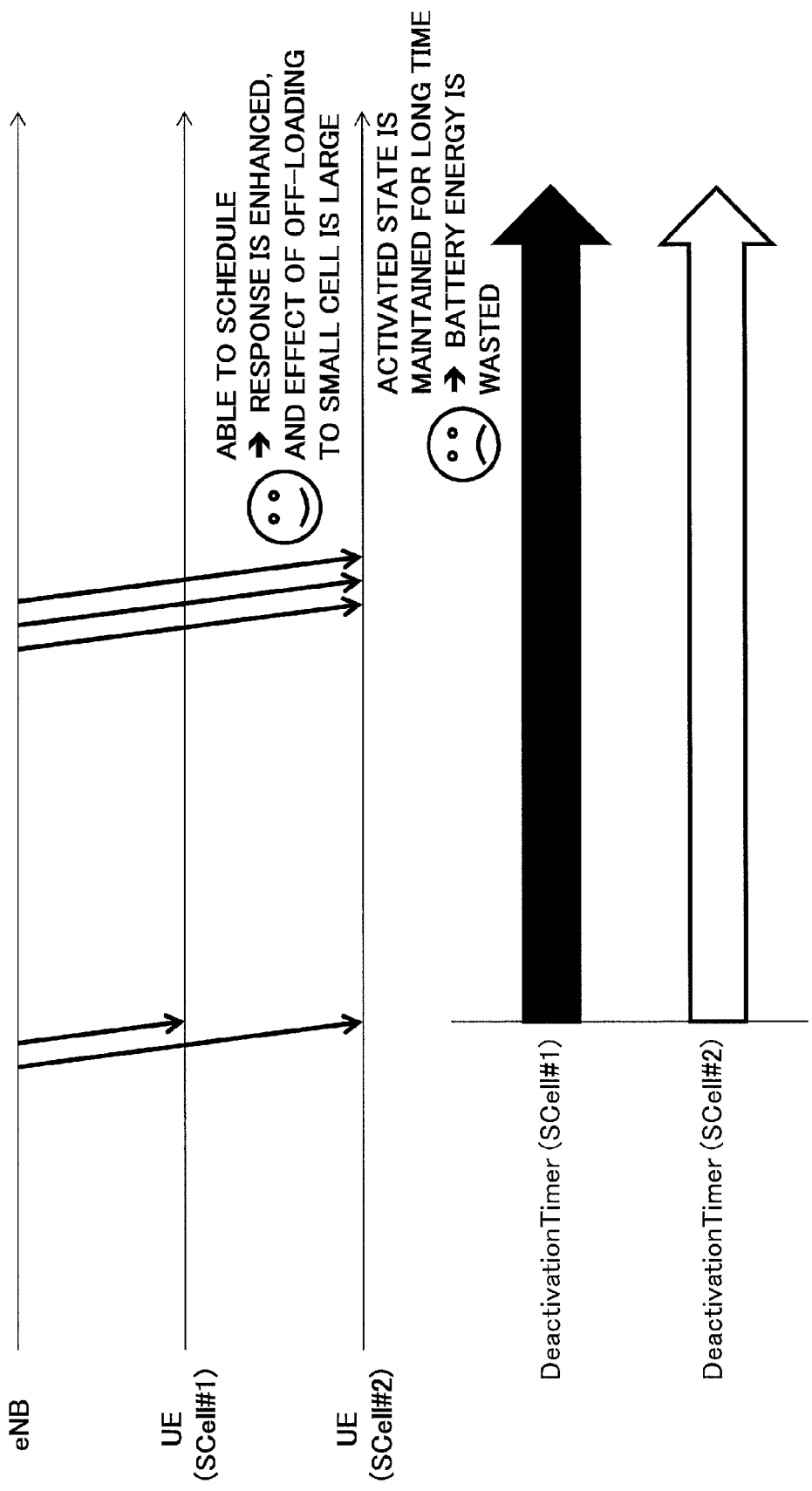
FIG. 3 is a diagram illustrating the operation related to the sCellDeactivationTimer (a long case) in units of UEs.

An embodiment of the present invention is described below by referring to the drawings. Note that the embodiment described below is merely an example, and embodiments to which the present invention is applied are not limited to the embodiment below. For example, in the embodiment, the target of the deactivation timer control is the SCell; however, the target of the deactivation timer control may be another type of a cell (e.g., PCell). Further, in the embodiment, the LTE mobile communication system is the target; however, the present invention is not limited to the LTE, and it can be applied to another mobile communication system. Furthermore, in the present specification and the scope of the claims, the term "LTE" is used in a sense to include schemes of Rel-12, or on and after Rel-12 of the 3GPP, unless as indicated otherwise.

(Overall Configuration of the System, and Overview of the Operation)

Figure 4:
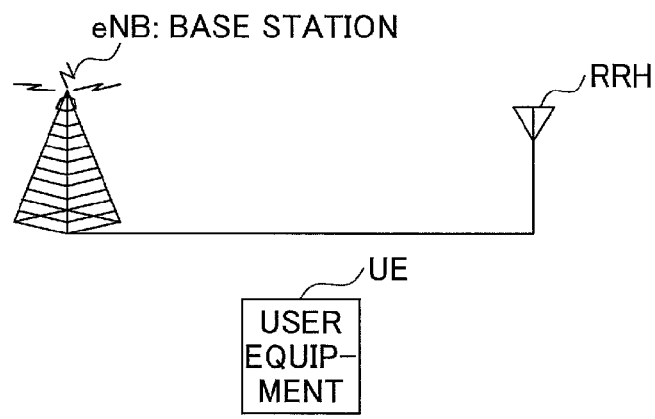
FIG. 4 is a configuration diagram of a communication system according to an embodiment of the present invention.

FIG. 4 illustrates a configuration diagram of a communication system in the embodiment of the present invention. As illustrated in FIG. 4, the communication system in the embodiment is a system including a base station eNB and user equipment UE. In FIG. 4, one base station eNB and one user equipment UE are illustrated; however, it is for convenience of depiction, and plural of these may be included.

Further, in the example of FIG. 4, the base station eNB itself is provided with a radio unit; and, at the same time, a radio unit (RRH) is installed at a location separated from the base station eNB. The radio unit is a part of the base station eNB; and it is connected to the base station eNB through an optical fiber, for example. In the embodiment, similar to the scenario illustrated in FIG. 1, CA can be achieved by the PCell and the SCell. Hereinafter, a timer value in units of user equipment, which has been used in related art, is referred to as a common timer value (which means that it is common for SCells within one UE); and a timer value that is to be set in units of SCells is referred to as an individual timer value.

In the embodiment, a signaling configuration is achieved that allows, while maintaining backward compatibility, setting of SCell individual timer values.

Namely, in the embodiment, it is assumed that, first, the base station eNB reports, by RRC signaling, the individual timer value to the user equipment UE depending on necessity, in addition to the common timer value.

For example, "depending on necessity" means that a case is assumed in which the base station eNB attempts to transfer (offload) traffic from a SCell of a macro cell to a SCell of a small cell, so that it is desirable to set an individual timer value of the SCell of the macro cell to be small, and to set an individual timer value of the SCell of the small cell to be large. If it is not in such a situation, and if setting of an individual timer value is not necessary, only the common timer value may be reported.

Furthermore, related to "depending on necessity," in the embodiment, the base station eNB can determine whether the user equipment UE supports individual timer values by capability information, such as the release number, reported from the user equipment UE to the base station eNB; and, upon determining that the user equipment UE does not support the individual timer values, the base station eNB may not report the individual timer values to the user equipment UE.

Furthermore, the individual timer value is to be set to the SCell individually, and it is necessary to specify the target SCell, so that, for reporting an individual timer value, the base station eNB reports, as a set, the individual timer value together with identification number (index) of the target SCell. Here, the identification number can be any number, provided that the SCell can be identified with the number; and, for example, a Cell Index of the SCell (an identification number of a Cell, which includes the PCell) may be used. Hereinafter, a set of an individual timer value and a SCell identification number is referred to as individual timer information. For a case where the "individual timer information" is related to a plurality of SCells, the "individual timer information" includes a plurality of the above-described sets, such as (SCell 1, timer value 1), (SCell 2, timer value 2), and so forth.

For user equipment UE that supports the individual timer value (which can execute timer control to which the individual timer value is applied), the base station eNB recognizes it, as described above. When the base station eNB transmits, to the user equipment UE, a common timer value and individual timer information by RRC signaling, the user equipment UE that receives these applies the individual timer value to the SCell specified by the individual timer information, and executes deactivation control by the individual timer value for the SCell. For the SCell that is not specified by the individual timer information, the user equipment UE executes deactivation control by applying the common timer value.

The base station eNB supporting the individual timer value recognizes whether the user equipment UE supports the individual timer value, so that the base station eNB can maintain timers that are synchronized with respective SCell timers that operate in each user equipment UE; can recognize an activated state/deactivated state of the SCell in the user equipment UE; and can properly perform scheduling, for example.

Furthermore, in the embodiment, the base station eNB not supporting the individual timer value can perform operations with the user equipment UE supporting the individual timer value, based on the common timer value, which is the same as that of related art.

OPERATION EXAMPLE

Some operation examples of the communication system according to the embodiment are described below by referring to the sequence diagrams. In each of the following examples, the base station supporting the individual timer value (which can report the individual timer value) can recognize whether the user equipment UE supports the individual timer value, so that the corresponding operation can be performed. In contrast, it is assumed that the base station that does not support the individual timer value performs the operation where the user equipment UE is assumed to support only the common timer value. Additionally, it is assumed that the user equipment UE may not recognize whether the base station eNB supports the individual timer value.

Further, transmission and reception of signals in the following operation examples are performed with RRC messages; however, it is not limited to this, and it may be performed with another message (e.g., MAC signals). Furthermore, the following examples illustrate only main signals related to the embodiment; and signals for activation and so forth are not depicted.

Operation Example 1

Figure 5:
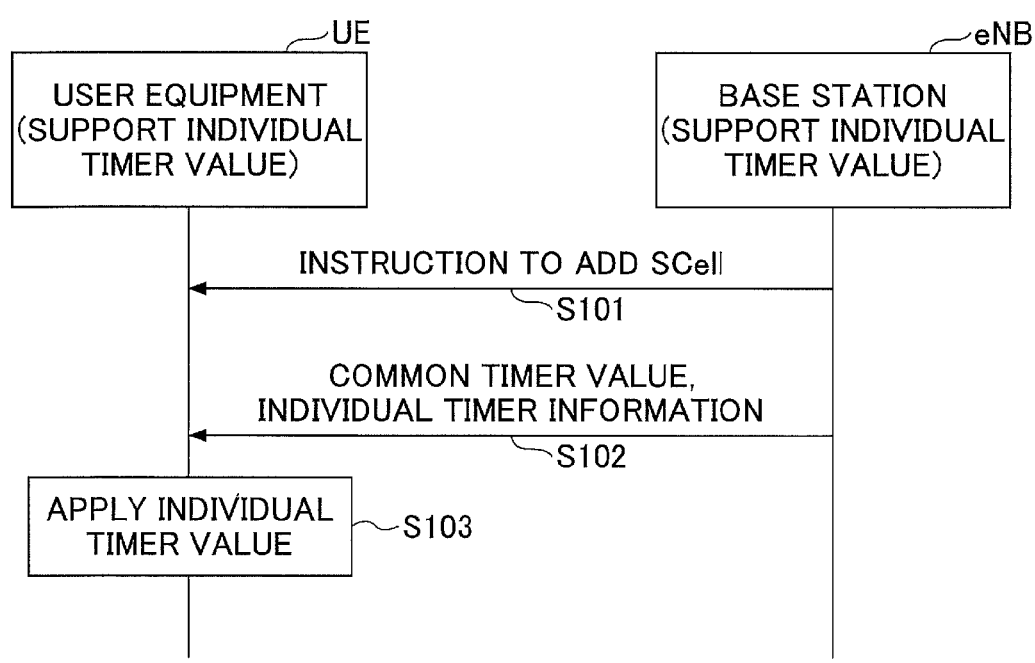
FIG. 5 is a diagram illustrating operation example 1 of the communication system in the embodiment of the present invention.

First, operation example 1 is described by referring to FIG. 5. Operation example 1 is an example for a case where the user equipment UE supports the individual timer value, and the base station eNB also supports the individual timer value.

In response to transmitting, by the base station eNB, an instruction to add a SCell to the user equipment UE (step 101), one or more SCells are established for the user equipment UE, and, at the same time, the base station eNB transmits, to the user equipment UE, a common timer value and the individual timer information (step S102). In FIG. 5, step 102 is performed after step 101; however, these may be simultaneously performed.

The user equipment UE executes, for the SCell specified by the individual timer information, deactivation timer control by performing control, such as activation of the timer, monitoring of the PDCCH, and monitoring of expiration of the timer, by applying the specified individual timer value (step 103). Additionally, for a case where, among the plurality of active SCells, there is a SCell that is not specified by the individual timer information, the user equipment UE executes deactivation timer control by applying the common timer value to that SCell.

For both cases of the individual and common, for example, upon receiving, for each of the SCells, an activation signal or a PDCCH (resource allocation), the user equipment UE starts or restarts (restart) the corresponding timer; and, upon detecting that the timer expires (the time period of the timer value elapses) without receiving an activation signal or a PDCCH, the user equipment UE deactivates the corresponding active SCell.

Figure 6:
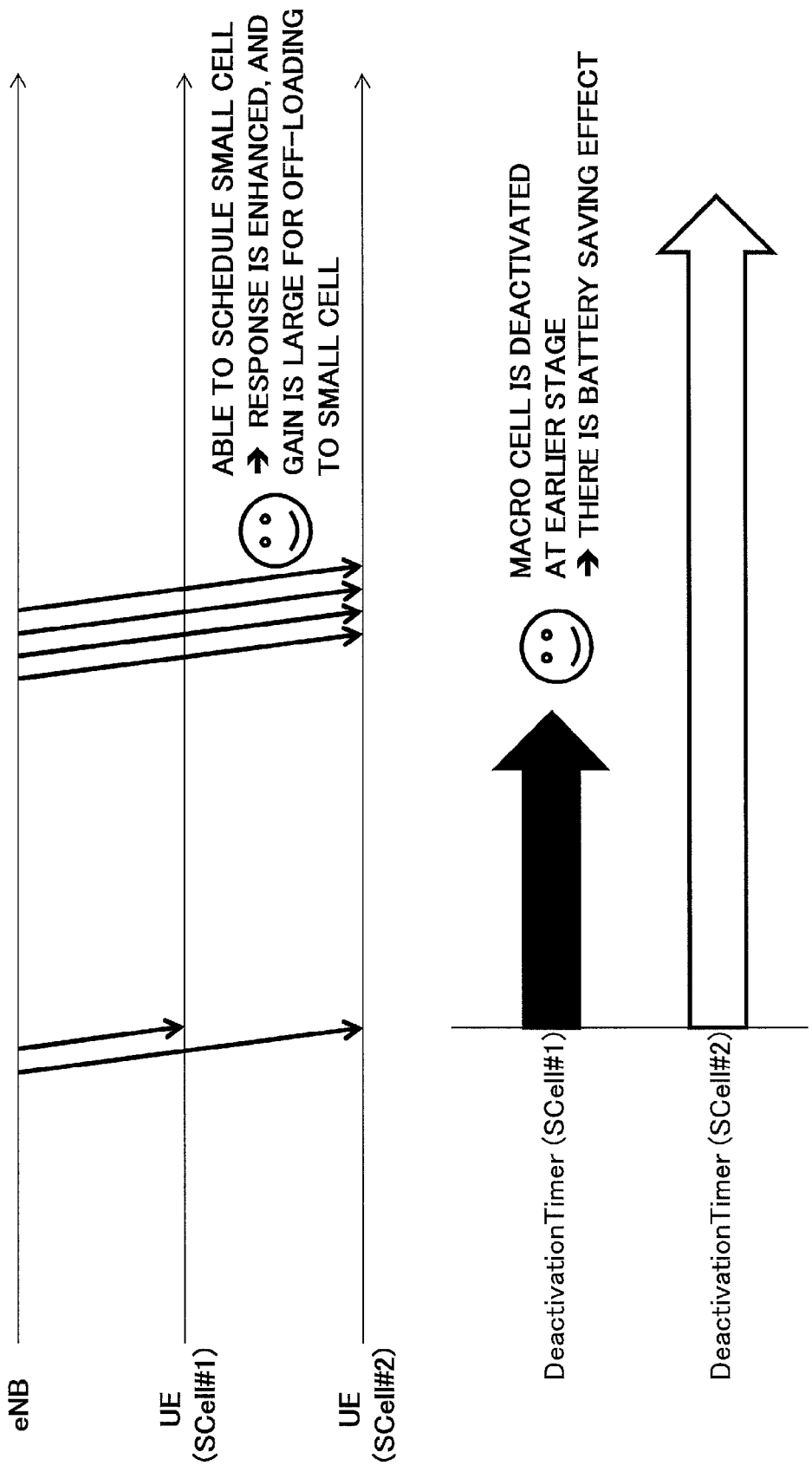
FIG. 6 is a diagram illustrating an example of timer control for a case where an individual timer value is applied.

FIG. 6 illustrates an example of timer control operation for a case where the individual timer value is applied. FIG. 6 shows a case of CA, which is formed of the PCell, the SCell #1, and the SCell #2; and, similar to FIG. 1, the PCell and the SCell #1 correspond to macro cells, and the SCell #2 corresponds to a small cell. Furthermore, the individual timer value corresponding to the SCell #1 is smaller than the individual timer value corresponding to the SCell #2.

In this case, scheduling opportunities increase for the small cell, so that offloading gain can be increased, and the response is enhanced. Furthermore, the macro cell (SCell #1) is deactivated at an earlier stage, so that a battery saving effect is obtained, compared to a case where both SCells are continued to be active.

Operation Example 2

Figure 7:
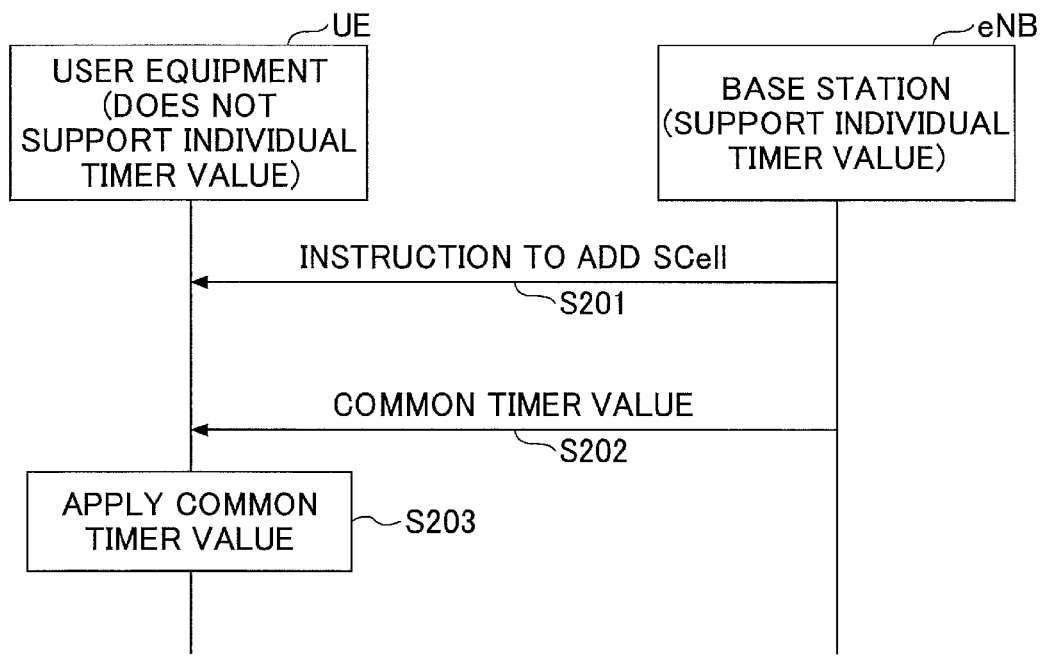
FIG. 7 is a diagram illustrating operation example 2 of the communication system in the embodiment of the present invention.

Next, operation example 2 is described by referring to FIG. 7. The operation example 2 is an example of a case where the user equipment UE does not support the individual timer value, and the base station eNB supports the individual timer value.

In response to transmitting, by the base station eNB, an instruction to add a SCell to the user equipment UE (step 201), one or more SCells are established for the user equipment UE, and, at the same time, the base station eNB transmits, to the user equipment UE, a common timer value (step S202). The user equipment UE executes, for each of the SCells, deactivation timer control by applying the common timer value (step 203).

In this example, the base station eNB transmits only the common timer value because the base station eNB recognizes that the user equipment UE does not support the individual timer value; however, if the base station eNB may not determine whether the user equipment UE supports the individual timer value, the base station eNB may transmit both common timer value and individual timer information. In this case, since the user equipment UE does not support the individual timer value, the user equipment UE ignores the information element indicating the individual timer value; and executes control that is the same as that of related art where only the common timer value is used. For a case of such control, for example, it can be considered to transmit, from the user equipment UE to the base station eNB, a signal indicating that the user equipment UE only uses the common timer value. Consequently, the base station eNB can recognize that only the common time value is used in the user equipment UE; and can execute deactivation/activation state management, which is synchronized with the user equipment UE.

Operation Example 3

Figure 8:
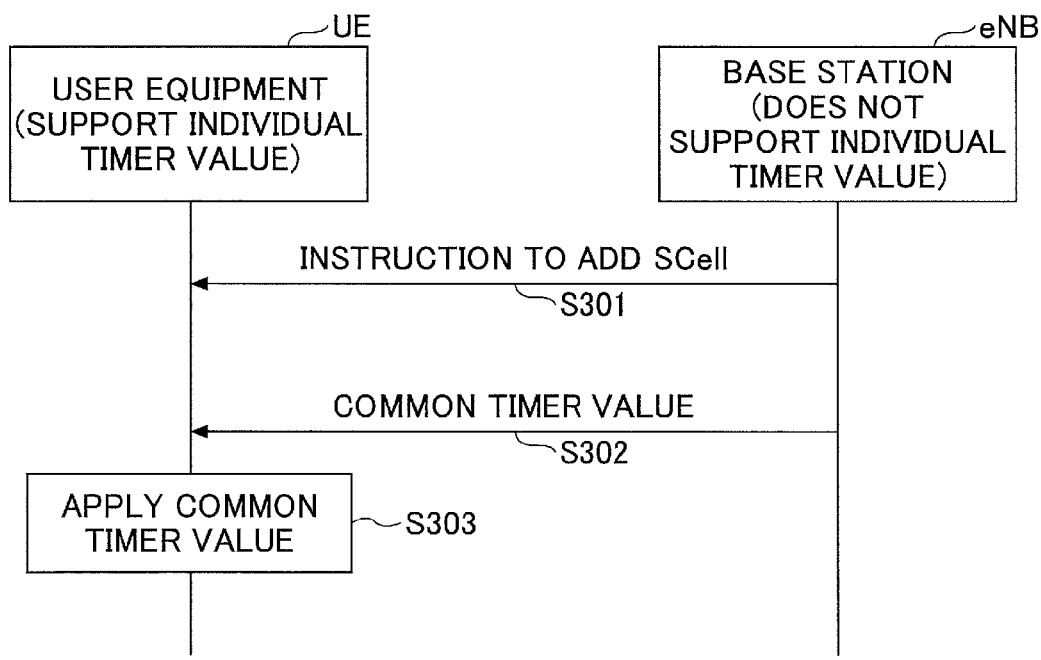
FIG. 8 is a diagram illustrating operation example 3 of the communication system in the embodiment of the present invention.

Next, operation example 3 is described by referring to FIG. 8. The operation example 3 is an example of a case where the user equipment UE supports the individual timer value, and the base station eNB does not support the individual timer value.

In response to transmitting, by the base station eNB, an instruction to add a SCell to the user equipment UE (step 301), one or more SCells are established for the user equipment UE, and, at the same time, the base station eNB transmits, to the user equipment UE, a common timer value (step S302).

Though the user equipment supports the individual timer value, since no individual timer information is received from the base station eNB, the user equipment UE executes, for each of the SCells, deactivation timer control by applying the common timer value (step 303).

As described above, according to the embodiment, operation can be properly performed for each of the cases where the individual timer value is supported/not supported in the user equipment UE and the base station eNB. Namely, the individual timer value can be set, while maintaining backward compatibility.

Operation Example 4

Figure 9:
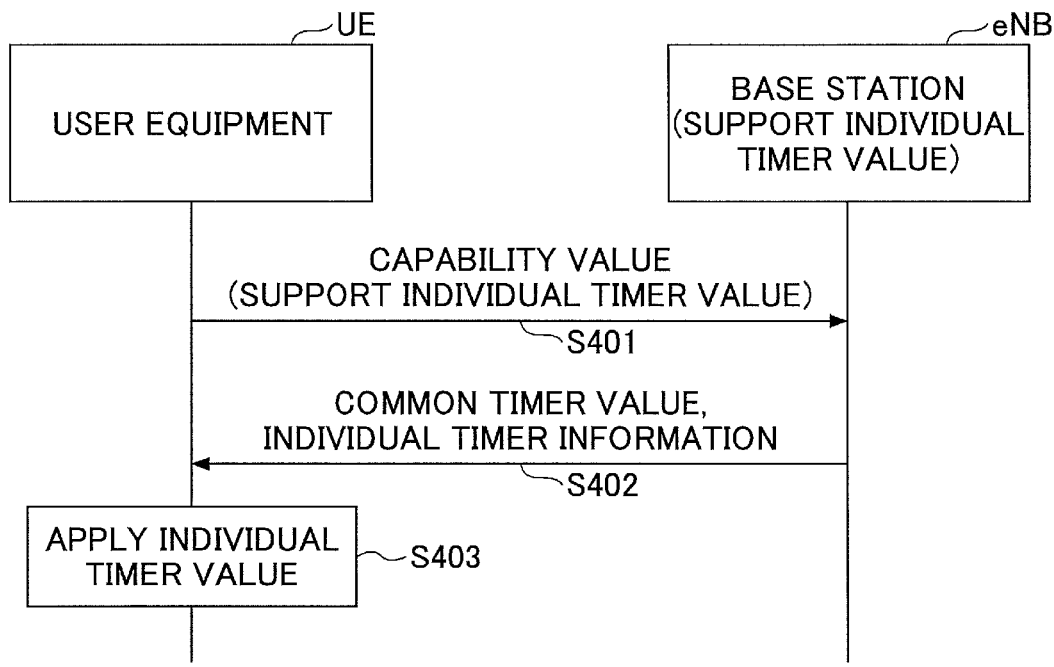
FIG. 9 is a diagram illustrating operation example 4 of the communication system in the embodiment of the present invention.

Next, operation example 4 is described by referring to FIG. 9. In the operation example 4, the user equipment UE is a UE based on a specification of a release that does not specify the individual timer value; however, the user equipment UE includes, as a function of the UE, a function for supporting the individual timer value (Early implementation). Further, the base station eNB supports the individual timer value. In this example, the user equipment UE reports, to the base station eNB, the release information that does not specify the individual timer value, so that the base station eNB determines that the user equipment UE does not support the individual timer value.

Accordingly, in this example, as illustrated in FIG. 9, the user equipment UE transmits, to the base station eNB, capability information indicating that the individual timer value is supported, separately from the release information (step 401). The capability information may be transmitted, for example, by the RRC message at the time of RRC connection; or may be transmitted by another signal at another timing.

The base station eNB that receives the capability information can recognize that the user equipment UE supports the individual timer value, so that the common timer value and the individual timer information can be transmitted, similar to the case of FIG. 5 (step 402). Then, similar to the case of FIG. 5, the user equipment UE executes deactivation timer control for the SCell specified by the individual timer information by applying the individual timer value (step 403); and, additionally, for a case where, among the plurality of active SCells, there is a SCell that is not specified by the individual timer information, the user equipment UE executes deactivation timer control by applying the common timer value to that SCell.

Here, as the capability information in the operation example 4, information may be reported that indicates that the UE is provided with capability for supporting the individual timer value; or information may be reported that indicates, for each band combination (a band combination of CCs with which CA can be performed), whether there is capability for supporting the individual timer value. Furthermore, for a case of the user equipment UE that supports Dual Connectivity, information may be reported that indicates, for each eNB (MeNB, SeNB), or for each CG (Cell Group), whether there is capability for supporting the individual timer value.

Operation Example 5

Operation Example for Changing Setting of the Individual Timer Value

Figure 10:
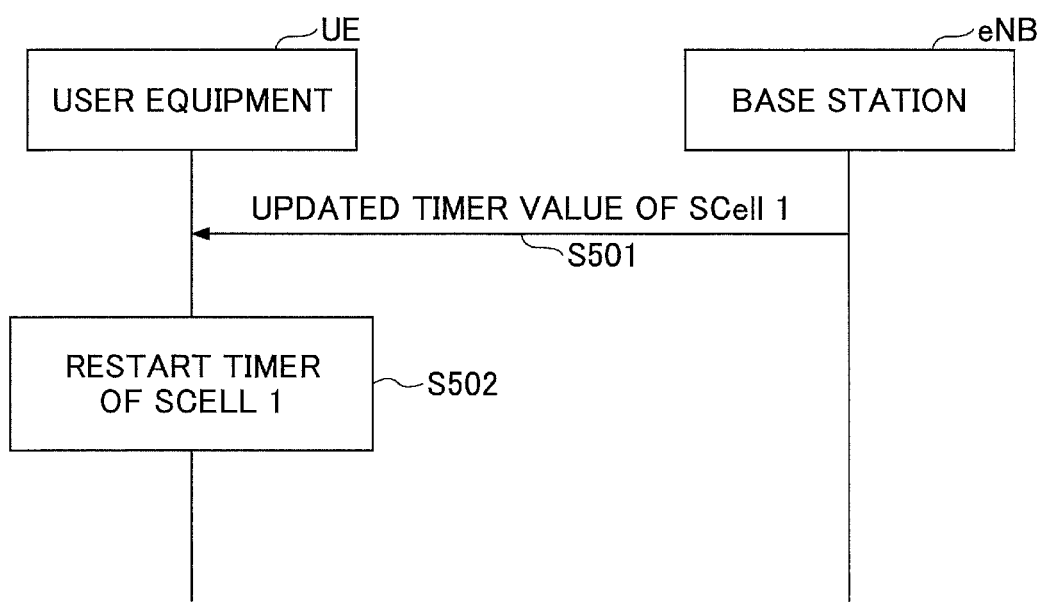
FIG. 10 is a diagram illustrating an operation example for a case where setting of the individual timer value is to be changed.

Next, by referring to FIG. 10, an operation example is described for a case where setting of the individual timer value is to be changed. In the embodiment, for each SCell, a timer value can be set depending on a condition of the network or on a traffic condition, so that a timer value may be changed for an active SCell by a determination by the base station eNB. In such a case, for example, a difference in recognition of timer values may occur in such a manner that, even if it is maintained, at the side of the base station eNB, that the user equipment UE uses the updated timer value B for the SCell 1, the user equipment UE is actually using, for the SCell 1, the timer value A prior to the update.

Thus, in operation example 5, in order to eliminate the difference in recognition of the timer values as much as possible, for example, as illustrated in FIG. 10, upon transmitting a timer value update instruction (step 501) from the base station eNB to the user equipment UE (in the example of FIG. 10, the timer value of the SCell 1 is updated), the user equipment UE restarts (restart) the timer of the SCell 1 corresponding to the update instruction, and executes expiration management of the restarted timer with the updated timer value (step 502).

In addition to the above-described operation, during transmission of the instruction to update the timer value of the SCell 1, the SCell may be deactivated by a command from the base station eNB. Further, instead of a command from the base station eNB, upon receiving the timer value update instruction, the user equipment UE may deactivate the SCell. After that, the base station eNB activates the SCell depending on necessity; and the user equipment UE applies a new timer value from that moment. Additionally, during updating the timer value, the SCell may be deleted, and a SCell may be newly added. Upon the added SCell being activated, the updated timer value is applied.

Note that operation example 4 and operation example 5 can be implemented in combination with another operation example. Further, related to all operation examples of the embodiment, in the user equipment UE that supports the individual timer value, if the individual timer information is not sent from the base station eNB during a time of handover or a time of reconfiguration (reconfiguration), the common timer value may be used.

Further, the base station eNB may report only the individual timer value which value is different from the common timer value. Namely, the base station eNB may report the individual timer information to the SCell only if a timer value that is different from the common timer value is set.

Then, for a case where the individual timer information is reported from the base station eNB to the user equipment UE together with the common timer value, the user equipment UE compares each individual timer value included in the individual timer information with the common timer value, and if there is an individual timer value which value is the same as the common timer value, the user equipment UE may determine that there is an abnormality (failure) in the RRC signaling signal (e.g., RRC reconfiguration).

(Examples of the Message)

FIG. 11A illustrates the MAC-MainConfig information element (an extract), which is an example of an information element of the RRC message including the individual timer information. In FIG. 11A, information of the DedicatedsCellDeactivationTimer corresponds to the individual timer information according to the embodiment. FIG. 11B is an example of the MAC-MainConfig field descriptions (an extract) in the form published in the specification of the LTE. In FIG. 11B, in addition to the description of the DedicatedsCellDeactivationTimer, which corresponds to the embodiment, the description of the existing sCellDeactivationTimer is also shown.

(Examples of the Device Configurations)

Next, examples of the device configurations of the user equipment UE and the base station eNB are described, which can perform the above-described operations.

<User Equipment UE>

Figure 12:
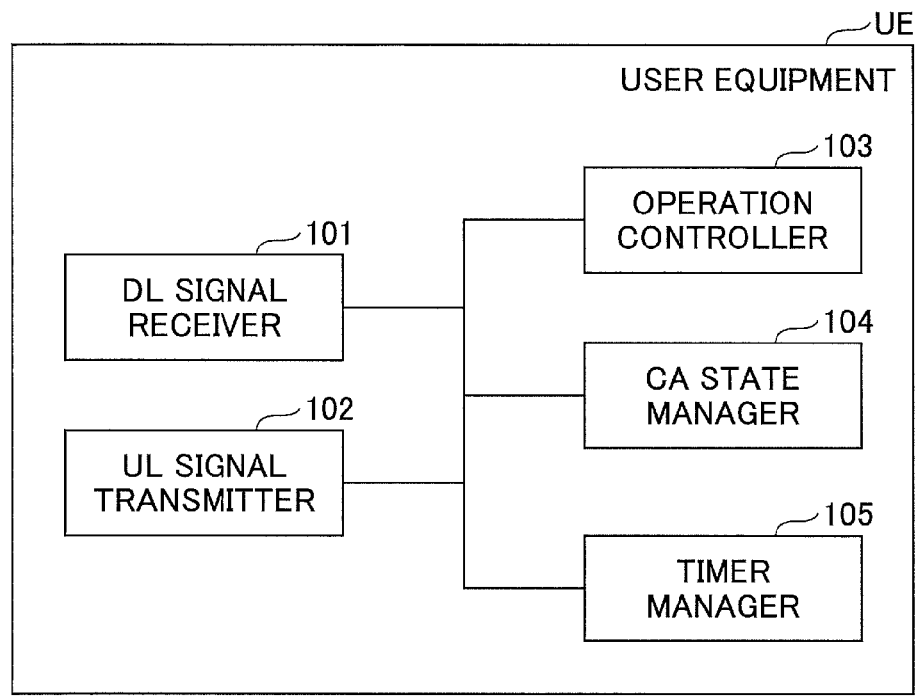
FIG. 12 is a configuration diagram of user equipment UE.

FIG. 12 illustrates a functional configuration diagram of the user equipment UE according to the embodiment of the present invention. As illustrated in FIG. 12, the user equipment UE includes a DL signal receiver 101; a UL signal transmitter 102; an operation controller 103; a CA state manager 104; and a timer manager 105. Note that FIG. 12 only illustrates the functional units that are particularly relevant to the present invention in the user equipment UE; and the user equipment UE also includes, at least, functions, which are not depicted, for performing the operation conforming to the LTE.

The DL signal receiver 101 includes a function for receiving various types of downlink signals from the base station eNB, and for retrieving more upper layer information from the received physical layer signals; and the UL signal transmitter 102 includes a function for generating various types of physical layer signals from upper layer information to be transmitted from the user equipment UE, and for transmitting these to the base station eNB. Furthermore, the DL signal receiver 101 and the UL signal transmitter 102 respectively include functions for executing communication through CA, for which a plurality of CCs (PCell, SCell) are utilized. Note that, the CA (carrier aggregation) in the embodiment includes, not only the Intra-eNB CA, but also the Inter-eNB CA (namely, Dual Connectivity).

As described above, the operation controller 103 implements setting of timer values, updating the setting, and addition and deletion of the SCell, which are based on the RRC signaling; and activation/deactivation control, timer control, and CA operation control, and so forth, which are based on the MAC signals. Furthermore, for a case where setting information is received from the base station eNB, which includes a common timer value that is common among a plurality of SCells and individual timer values which are specified for respective SCells, the operation controller 103 applies the individual timer values to the specified cells, and executes timer control; and, at the same time, for a case where a SCell is used for which no individual timer is specified, the operation controller 103 executes timer control by applying the common timer value to the SCell.

The latest information of the CA state (e.g., information of the established SCell, activated/deactivated information for each SCell) is stored in the CA state manager 104, and it is referred to by the operation controller 103. The timer manager 105 executes, for each SCell, activation (restart) of a timer based on a common timer value or an individual timer value based on an instruction from the operation controller 103; and finds whether each timer has expired. When the timer expires, it is reported to the operation controller 103.

<Base Station eNB>

Figure 13:
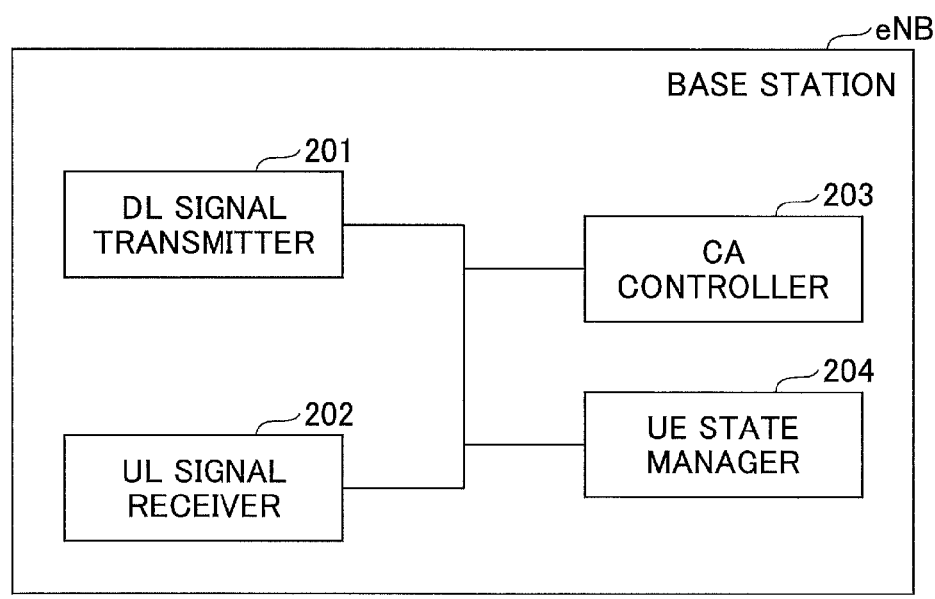
FIG. 13 is a configuration diagram of a base station eNB.

FIG. 13 illustrates a functional configuration diagram of the base station eNB according to the embodiment of the present invention. As illustrated in FIG. 13, the base station eNB includes a DL signal transmitter 201; a UL signal receiver 202; a CA controller 203; and a UE state manager 204. Note that FIG. 13 only illustrates the functional units that are particularly relevant to the present invention in the base station eNB; and the base station eNB also includes, at least, functions, which are not depicted, for performing the operation conforming to the LTE.

The DL signal transmitter 201 includes a function for generating various types of physical layer signals from upper layer information to be transmitted from the base station eNB, and for transmitting them. The UL signal receiver 202 includes a function for receiving various types of uplink signals from the user equipment UE, and for retrieving more upper layer information from the received physical layer signals. Furthermore, the DL signal transmitter 201 and the UL signal receiver 202 respectively include functions for executing communication by CA, for which a plurality of CCs (PCell, SCell) are utilized.

The CA controller 203 in the embodiment includes a function for generating RRC signaling information including a common timer value and an individual timer information, which are described above, based on information stored in the UE state manager 204, and for transmitting it from the DL signal transmitter 201; a function for generating an activating/deactivating signal, and for transmitting it from the DL signal transmitter 201, and so forth. Further, the CA controller 203 includes a function for transmitting, to the user equipment UE, setting information including a common timer value that is common for a plurality of SCells, or setting information including both the common timer value and an individual timer value that is specified for each SCell, based on the capability information of the user equipment UE, for example.

The UE state manager 204 receives the above-described capability information from each UE and stores it; and, at the same time, manages, for each UE, a state of each SCell (e.g., an activated/deactivated state, a state of the timer).

Figure 14:
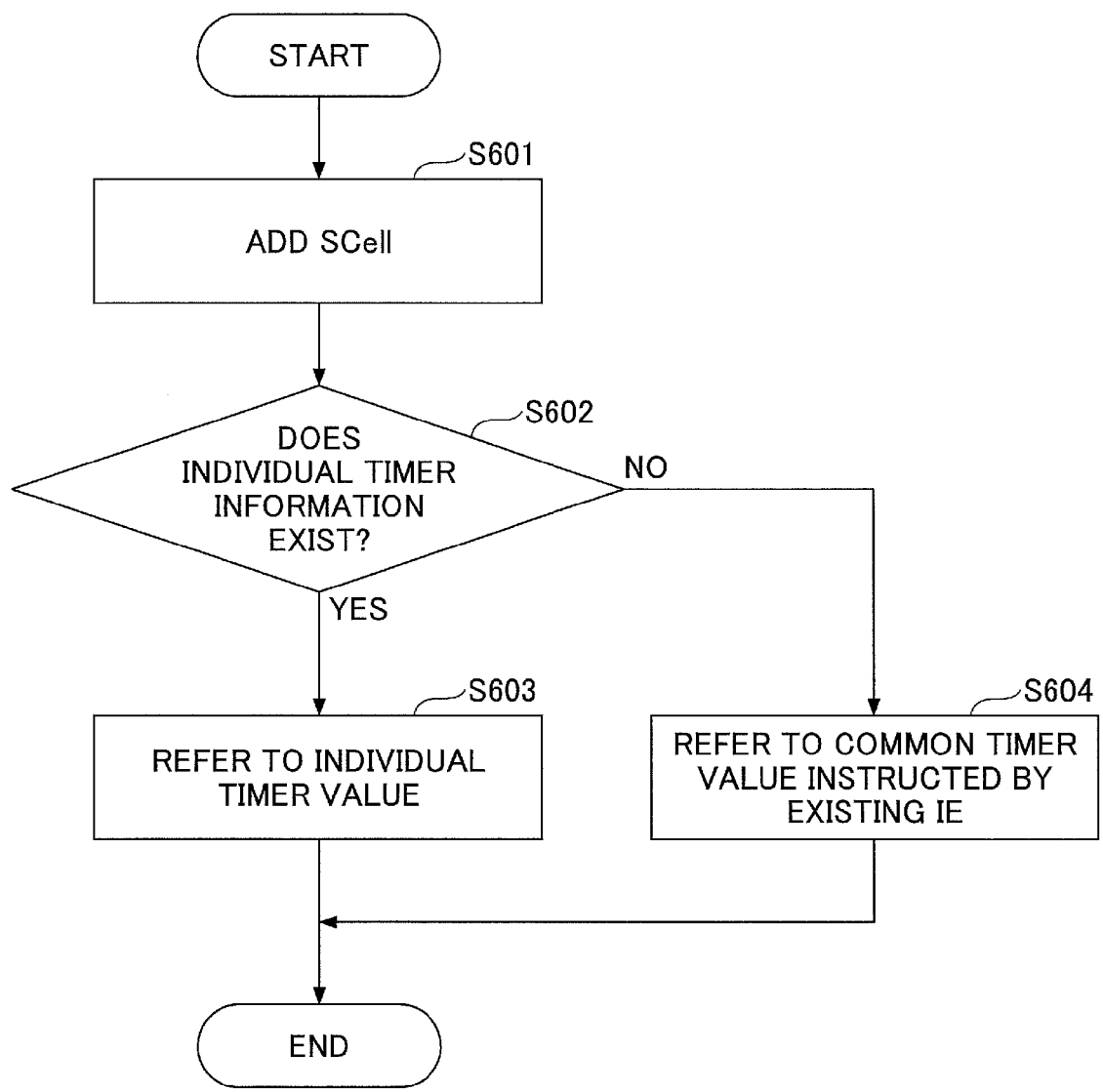
FIG. 14 is a flowchart illustrating an operation example of the user equipment UE.

The operations of the user equipment UE and the base station eNB are as described as operation examples 1 through 5, and so forth; and FIG. 14 illustrates an example of a timer value setting operation and control operation in the user equipment UE. As illustrated in FIG. 14, the operation controller 103 of the user equipment UE adds an SCell based on the RRC signaling from the base station eNB (step 601). In this operation example, the RRC signaling includes information on a timer.

The operation controller 103 checks whether individual timer information is included in the information received through the RRC signaling (step 602); if it exists (Yes at step 602), the process proceeds to step 603; and if it does not exist (No at step 602), the process proceeds to step 604.

At step 603, the operation controller 103 implements deactivation timer control by applying the individual timer value to the SCell that is specified by the individual timer information. Furthermore, the operation controller 103 implements the deactivation timer control by applying the common timer value to the active SCells that are not specified by the individual timer information. At step 604, the operation controller 103 implements deactivation timer control by applying the common timer value to each of the SCells.

CONCLUSIONS OF THE EMBODIMENT, AND EFFECTS, ETC.

According to the embodiment of the present invention, there is provided user equipment of a mobile communication system in which communication is performed between the user equipment and a base station by carrier aggregation, the user equipment including a controller that executes timer control for deactivating a cell used for the carrier aggregation, based on expiration of a timer; and a receiver that receives, from the base station, setting information including a timer value of the timer used in the controller, wherein, when the receiver receives the setting information including a common timer value that is common for a plurality of cells used for the carrier aggregation and an individual timer value that is specified for each cell, the controller executes the timer control by applying the individual timer value to the specified cell, and when another cell is used for which no individual timer value is specified, the controller executes the timer control by applying the common timer value to the other cell.

With this configuration, in a mobile communication system, in which, a timer value is to be set that is common for the cells, the deactivation timer control can be properly performed, even for a case of setting cell individual timer values.

When the receiver receives, from the base station, setting information including the common timer value and not including the individual timer value, the controller may execute the timer control by applying the common timer value to each cell. With this configuration, the user equipment can properly execute the deactivation timer control, even for a case where it is to be connected to a base station that does not support the individual timer value.

When the receiver receives an update instruction for the individual timer value from the base station, the controller may restart a timer of a cell that is a target of the individual timer value, and may apply the updated individual timer value. With this configuration, the update of the individual timer value in the base station can be quickly reflected to the user equipment, so that occurrence of a difference between the timer values can be suppressed.

When the receiver receives an update instruction for the individual timer from the base station, the controller may deactivate or delete a cell that is a target of the individual timer value; and, upon detecting that the cell is activated, the controller may apply the individual timer value of the update instruction to the cell. With this configuration, a difference of the timer values for the deactivation control can be prevented from occurring, between the base station and the user equipment.

When the receiver receives setting information including the common timer value and one or more individual time values, the controller may compare the individual timer values with the common timer value; and, upon detecting that there exists an individual timer value that matches the common timer value, the controller may determine that there is a failure in the setting information. With this configuration, for a case where the base station is to report only the individual timer values that are different from the common timer value, a failure in the setting information can be detected.

The controller may transmit, to the base station, capability information indicating that the user equipment is able to apply the individual timer value. With this configuration, the base station can find that the user equipment supports the control by the individual timer value, and reporting of the individual timer value can be properly performed.

A cell that is a target of the timer control may be an SCell. With this configuration, deactivation control suitable for the LTE can be performed.

The functional configuration of the user equipment UE described in the embodiment may be a configuration that is implemented by executing a program by the CPU (processor) in the user equipment including the CPU and the memory; a configuration that is implemented by hardware provided with a logic for the process described in the embodiment, such as a hardware circuit; or a mixture of programs and hardware.

The functional configuration of the base station described in the embodiment may be a configuration that is implemented by executing a program by the CPU (processor) in the base station including the CPU and the memory; a configuration that is implemented by hardware provided with a logic for the process described in the embodiment, such as a hardware circuit; or a mixture of programs and hardware.

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of description, the user equipment and the base station are described by using the functional block diagrams; however, such devices may be implemented in hardware, software, or combinations thereof. Each of the software programs to be executed by the processor included in the user equipment and the software programs to be executed by the processor included in the base station eNB in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present invention is not limited to the above-described embodiment; and various variations, modifications, alternatives, replacements, and so forth are included in the present invention without departing from the spirit of the present invention.

This patent application is based upon and claims the benefit of priority of Japanese Patent Application No. 2014-145397 filed on Jul. 15, 2014, and the entire contents of Japanese Patent Application No. 2014-145397 are incorporated herein by reference.

LIST OF REFERENCE SYMBOLS eNB: base station
UE: user equipment
101: DL signal receiver
102: UL signal transmitter
103: Operation controller
104: CA state manager
105: timer manager
201: DL signal transmitter
202: UL signal receiver
203: CA controller
204: UE state manager

The invention claimed is:

1. User equipment of a mobile communication system in which communication is performed between the user equipment and a base station by carrier aggregation, the user equipment comprising:
a controller that executes timer control for deactivating a cell used for the carrier aggregation, based on expiration of a timer; and
a receiver that receives, from the base station, setting information including a timer value of the timer used in the controller,
wherein, when the receiver receives the setting information including a common timer value that is common for multiple cells used for the carrier aggregation and an individual timer value that is specified for each cell, the controller executes the timer control by applying the individual timer value to the specified cell, and when another cell is used for which no individual timer value is specified, the controller executes the timer control by applying the common timer value to the other cell.

2. The user equipment according to claim 1, wherein, when the receiver receives, from the base station, setting information including the common timer value and not including the individual timer value, the controller executes the timer control by applying the common timer value to each cell.

3. The user equipment according to claim 1, wherein, when the receiver receives an update instruction for the individual timer value from the base station, the controller restarts a timer of a cell that is a target of the individual timer value, and applies the updated individual timer value.

4. The user equipment according to claim 1, wherein, when the receiver receives an update instruction for the individual timer from the base station, the controller deactivates or deletes a cell that is a target of the individual timer value; and, upon detecting that the cell is activated, the controller applies the individual timer value of the update instruction to the cell.

5. The user equipment according to claim 1, wherein, when the receiver receives setting information including the common timer value and one or more individual time values, the controller compares the individual timer values with the common timer value; and, upon detecting that there exists an individual timer value that matches the common timer value, the controller determines that there is a failure in the setting information.

6. The user equipment according to claim 1, wherein the controller transmits, to the base station, capability information indicating that the user equipment is able to apply the individual timer value.

7. The user equipment according to claim 1, wherein the cell that is a target of the timer control is an SCell.

8. A mobile communication system including user equipment and a base station that perform carrier aggregation, wherein the user equipment comprises:
a controller that executes timer control for deactivating a cell used for the carrier aggregation, based on expiration of a timer; and
a receiver that receives, from the base station, setting information including a timer value of the timer used in the controller, wherein
the base station comprises:
a transmitter that transmits, to the user equipment, the setting information including a common timer value that is common for multiple cells used for the carrier aggregation, or the setting information including both the common timer value and an individual timer value specified for each cell,
wherein, when the user equipment receives, by the receiver, the setting information including the common timer value and the individual timer value, the user equipment executes, by the controller, the timer control by applying the individual timer value to the specified cell, and when another cell is used for which no individual timer value is specified, the user equipment executes, by the controller, the timer control by applying the common timer value to the other cell.

9. A deactivation timer control method to be executed by user equipment of a mobile communication system in which communication is performed between the user equipment and a base station by carrier aggregation, the deactivation timer control method comprising:
a receiving step of receiving, from the base station, setting information including a timer value of a timer that is used for timer control for deactivating a cell used for the carrier aggregation, based on expiration of the timer; and
a controlling step of executing the timer control,
wherein, when the user equipment receives, in the receiving step, the setting information including a common timer value that is common for multiple cells used for the carrier aggregation, and an individual timer value that is specified for each cell, the user equipment executes, in the controlling step, the timer control by applying the individual timer value to the specified cell, and when another cell is used for which no individual timer value is specified, the user equipment executes, in the controlling step, the timer control by applying the common timer value to the other cell.

* * * * *